United States Patent Office 2,819,287
Patented Jan. 7, 1958

2,819,287

3-THIOUREAPHTHALIDES

Donald D. Wheeler and David C. Young, Midland, Mich., assignors to The Dow Chemical Company, Midland, Mich., a corporation of Delaware No Drawing. Application July 5, 1956
Serial No. 595,854

4 Claims. (Cl. 260—343.3)

This invention is concerned with phthalides having the formula

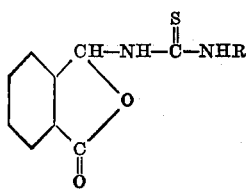

In this and succeeding formulae, R represents hydrogen or a lower alkyl, benzyl or phenyl radical. By the expression "lower alkyl" is meant radicals containing from 1 to 5 carbon atoms, inclusive, such as methyl, ethyl, isopropyl, and amyl.

The new compounds are light colored solids somewhat soluble in many organic solvents such as ethanol and acetone and substantially insoluble in water and petroleum ether. These compounds are useful as toxicants in antimicrobial and insecticidal compositions.

The above compounds may be prepared by causing phthalaldehydic acid to react with a thiourea having the structure

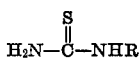

to produce the desired phthalide and water of reaction. The terms "phthalaldehydic acid" and "3-hydroxyphthalide" refer to a compound having the structure

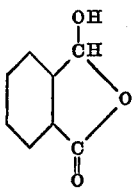

Phthalaldehydic acid is often represented in the literature as having the structure

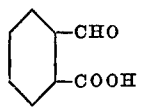

However, the acid employed in this invention and prepared as hereinafter described consists almost entirely of the 3-hydroxyphthalide ring structure, as indicated by a study of its infrared absorption spectrum. Infrared data also indicate the phthalide products to have the ring structure.

The reaction takes place readily in the temperature range of from 50° to 110° C. with the formation of the desired compound and water of reaction. It is preferably carried out in an inert solvent such as benzene or 2-butanone as reaction medium. Good results are obtained when substantially equimolar proportions of the reactants are employed, however a reasonable excess of either reactant does not interfere with the reaction. A large excess of phthalaldehydic acid, particularly at elevated temperatures may form an anhydride by-product.

In carrying out the reaction, phthalaldehydic acid and the appropriate thiourea are dissolved in or mixed with a solvent such as 2-butanone or benzene. The mixture is heated, preferably under reflux for from 0.5 to 4 hours during which time the product may precipitate from the reaction mixture as a crystalline solid. At the end of this period, the mixture is allowed to cool. The product usually precipitates and is removed from the mixture by filtration. The product may be purified, if desired, by washing and drying. Alternatively, at the end of the heating period, the solvent may be removed by distillation and the product recovered as residue. The product residue may be purified as previously described.

The following examples illustrate the invention but are not to be construed as limiting.

*Example 1.—3-thioureidophthalide*

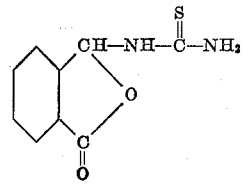

38.1 grams (0.5 mole) of thiourea and 75.0 grams (0.5 mole) of phthalaldehydic acid were dissolved in 200 milliliters of methyl ethyl ketone and the resulting solution heated in the temperature range of 80°–85° C. under reflux. After the heating had proceeded for about one hour a solid started to precipitate in the reaction mixture. Heating was continued for an additional 1.5 hours. At the end of this period, the mixture had turned to a semisolid mass. The latter was then allowed to cool and the solid removed therefrom by filtration and washed with methyl ethyl ketone to obtain a 3-thioureidophthalide product as a white solid melting at 212°–214° C. The yield amounted to 65 grams or 62 percent of theoretical.

*Example 2.—3-(3-phenyl-2-thioureido)phthalide*

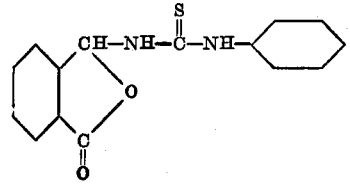

15.2 grams (0.1 mole) of phenylthiourea, 15.0 grams (0.1 mole) of phthalaldehydic acid and 75 milliliters of benzene were mixed together and heated on the steam bath under reflux for two hours. Thereafter, the mixture was cooled whereupon a solid product precipitated. The latter was separated from the mixture by filtration and washed successively with benzene, water and acetone to obtain a 3-(3-phenyl-2-thioureido)phthalide product melting at 184°–185° C.

*Example 3.—3-(3-ethyl-2-thioureido)phthalide*

52.1 grams (0.5 mole) of ethylthiourea, 75.0 grams (0.5 mole) of phthalaldehydic acid and 200 milliliters of methyl ethyl ketone are mixed together and the resulting solution heated under reflux for several hours. Thereafter the solvent and water of reaction is removed by distillation under reduced pressure to obtain a 3-(3-ethyl-2-thioureido)phthalide product as residue. The latter has a molecular weight of 236.

*Example 4.—3-(3-benzyl-2-thioureido)phthalide*

83.0 grams (0.5 mole) of benzylthiourea, 75.0 grams (0.5 mole) of phthalaldehydic acid and 200 milliliters of methyl ethyl ketone are mixed together and the resulting solution heated under reflux for several hours to obtain a 3-(3-benzyl-2-thioureido)phthalide product. The latter is recovered by filtration and washed with acetone to obtain a purified product having a molecular weight of 298.

*Example 5.—3-(3-secondary-butyl-2-thioureido) phthalide*

66.0 grams (0.5 mole) of secondary-butylthiourea, 75.0 grams (0.5 mole) of phthalaldehydic acid and 200 milliliters of methyl ethyl ketone are mixed together and the resulting solution heated under reflux for several hours. Thereafter, the mixture is heated to distill off the solvent and water of reaction and to obtain as residue a 3-(3-secondary-butyl-2-thioureido)phthalide product having a molecular weight of 264.

The products of the present invention have antimicrobial activity and are adapted to be employed in germicidal and disinfectant compositions. In a representative operation, a solid nutrient agar medium saturated with 3-thioureidophthalide gave complete inhibition of growth when streaked with *Staphylococcus aureus* and incubated at 30° C. for three days.

The products are also useful in insecticidal compositions. For example, complete control of southern army worm larva (*Prodenia eridania*) was obtained when aqueous compositions containing 500 parts per million of 3-(3-phenyl-2-thioureido)phthalide were applied to plant surfaces infested with the organism.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene may be heated with an aqueous constant boiling hydrochloric acid and ferric chloride solution containing from 4 to 35 percent by weight of metal halide to obtain phthalaldehydic acid as more fully disclosed in U. S. Patent 2,748,162.

We claim:
1. A phthalide having the formula

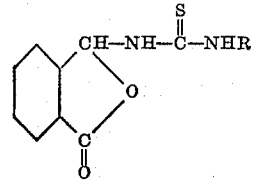

wherein R represents a member of the group consisting of hydrogen, lower alkyl, benzyl and phenyl.

2. 3-thioureidophthalide.
3. 3-(3-phenyl-2-thioureido)phthalide.
4. A method for preparing a phthalide having the formula

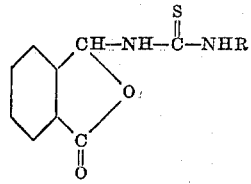

wherein R represents a member of the group consisting of hydrogen, lower alkyl, benzyl and phenyl, which comprises the step of mixing phthalaldehydic acid and a thiourea having the structure

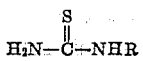

wherein R is as above defined and maintaining the mixture at a temperature of from 50° to 110° C. for a time sufficient to allow completion of the reaction.

No references cited.